May 26, 1970     R. P. CAHN ETAL     3,514,274

TRANSPORTATION OF NATURAL GAS AS A HYDRATE

Filed Feb. 18, 1965

INVENTORS
ROBERT P. CAHN
ROBERT H. JOHNSTON
JAMES A. PLUMSTEAD, JR.

BY

ATTORNEY

United States Patent Office 3,514,274
Patented May 26, 1970

3,514,274
TRANSPORTATION OF NATURAL GAS
AS A HYDRATE
Robert P. Cahn, Millburn, and Robert H. Johnston, Morris Plains, N.J., and James A. Plumstead, Jr., The Hague, Netherlands, assignors to Esso Research and Engineering Company, a corporation of Delaware
Filed Feb. 18, 1965, Ser. No. 434,739
Int. Cl. F17c 7/02; F25j 3/00
U.S. Cl. 48—190
4 Claims

ABSTRACT OF THE DISCLOSURE

Natural gas is advantageously transported by ship from a loading point to a point of delivery remote from said loading point by first contacting the natural gas with a propane hydrate in the form of solid particles under appropriate temperature and pressure conditions. As a result there is formed a natural gas hydrate, also as a slurry of crystals, which is carried in the liquid menstrum, in this case liquid propane. The hydrate is transported by said ship at temperatures and pressures suitable to maintain it in its hydrated condition and upon reaching its point of destination, it is dehydrated, while at the same time rehydrating the propane.

---

Figure 1:
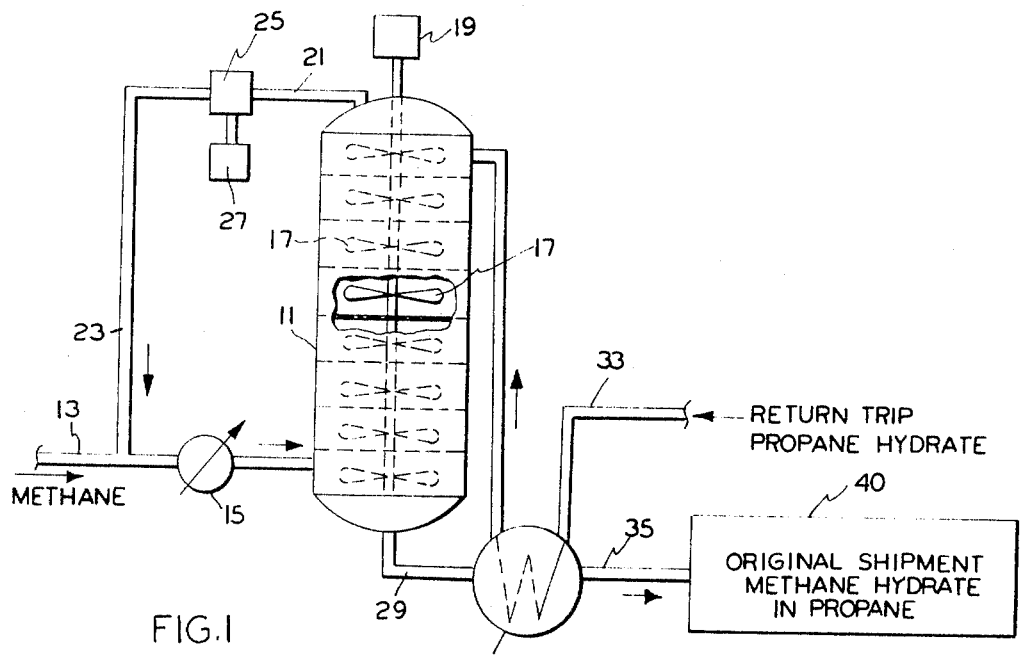

The present invention relates to an improved system for transporting natural gas and related materials in the form of hydrates. It is particularly related to a system by means of which very low-boiling and normally gaseous hydrocarbons, such as natural gas particularly, may be shipped very economically. This is accomplished by converting the gas to a denser material in the form of hydrates and by substituting other hydrates, e.g., of readily liquefiable hydrocarbons, for the back-haul. In this way it is possible substantially to reduce the net cost of hydration and dehydration and to improve the economy of the whole operation.

Briefly, according to the present invention, a natural gas, which consists mainly of methane, first is contacted with a propane-hydrate in the form of a slurry of solid particles under appropriate temperature and pressure conditions. As a result there is formed a natural gas hydrate, also as a slurry of crystals, which is carried in the liquid menstrum, in this case liquid propane. Temperature and pressure must, of course, be controlled so that the hydrates will not decompose. Alternatively, other liquid carrier materials such as butane may be used in lieu of propane if desired. The resulting slurry of solid particles of hydrate of methane (primarily) in liquid hydrocarbon, is then shipped to a re-gasification or delivery site, e.g., where the gas is to be used or is to be passed through transporting lines for further use or processing. At the delivery site the propane-natural gas-hydrate slurry is contacted with propane vapors under such temperature and pressure conditions as to dehydrate the natural gas and to form the propane hydrate. These respective hydrates are formed and decomposed in suitable units, such as columns and re-boilers, under temperature and pressure conditions that decompose the natural gas hydrate while they favor the re-formation of the propane hydrate. The latter hydrate, then, is formed as a slurry of solid particles which are largely insoluble but physically supported in the carrier liquid, i.e., propane. The propane hydrate slurry in liquid propane, as thus obtained, is then shipped back to the original natural gas hydration plant. There, the propane hydrate is dehydrated and the water of hydration is again transferred to the methane. This cyclic operation conserves much of the energy and refrigeration required respectively for hydrating the methane and dehydrating the methane hydrate. The water of hydration can be reused and the process can be repeated over and over at economical cost.

While the invention is intended primarily for transportation of natural gas from one place to another, preferably by barge or ship, it is obviously applicable to storage of natural gas, e.g., to take care of peak demands.

In the prior art, it has been suggested that natural gases can be shipped in liquid form at low pressure by storing them in insulated vessels and allowing them to evaporate as fast as heat leaks in. This, of course, requires extremely low liquefaction temperatures and considerable refrigeration. It also involves serious problems in equipment and tankage design since common steels are not serviceable for storage of liquids at such low temperatures. In a copending application, filed contemporaneously herewith, it has been suggested that natural gas may be shipped in the form of a hydrate, the return trip conserving refrigeration by bringing back ice recovered in dehydration. In order, however, for a process of this character to have real economic advantages it is most important that the energy required to form the hydrate and also to dehydrate be conserved as far as possible and not lost upon re-gasification. Otherwise, the economics of the operation frequently will not permit the advantages of the method to be fully realized.

According to the present invention, a method has been devised whereby both the energy of hydration and also the water of hydration, the latter of which then may be relatively pure, are greatly conserved. The water can be shipped back from the gas delivery point to the hydration site in the form of a hydrate of another hydrocarbon, preferably propane. In the latter case, considerable refrigeration is saved too.

In starting out at the hydration plant, a natural gas is contacted, at a suitable relatively high pressure and at a temperature near the freezing point of water, with a slurry of propane hydrate. The latter consists of particulate solids carried in liquid propane, preferably at a pressure above 80 pounds per square inch. This is about the minimum pressure for keeping propane hydrated that can be employed at normal temperatures and the pressure should, for reasons of efficiency, be considerably higher, preferably around 600 pounds per square inch where feasible. In general, any pressure above about 80 p.s.i.a. is satisfactory and it may go as high as 1,000 p.s.i.a. or more if desired. By lowering the temperature, somewhat lower pressures may be used, but this usually will require expensive refrigeration. The contacting temperature for making the natural gas hydrate is preferably at or just above the freezing point for water, for example, a temperature of about 35° F. is very satisfactory. It may be varied from about 30–40° F.; the lower temperature named is feasible where turbulence prevents freezing of the water. Under such temperature and pressure conditions natural gas is contacted counter-currently with a slurry of solid particulate propane hydrate carried in liquid propane. In this reaction the natural gas hydrate is formed as the propane is dehydrated and water is released therefrom. The resulting methane hydrate is then withdrawn as a slurry of crystals. These are still carried or suspended in the propane liquid. Any natural gas which has not reacted to form a hydrate may be re-cycled, thus increasing the natural gas concentration relative to that of propane. The natural gas hydrate obtained in the process may be cooled to a considerably lower temperature than that actually required for hydration, if desired, in order that it may be shipped at or near atmospheric pressure. Thus, when a cargo of natural gas hydrate-liquid propane slurry can be cooled and kept cooled to around —40° F., it may be shipped at approximately atmospheric pressure. Where the storage tank or vessel is well insulated, such operations are economical.

At the point of delivery, gasification, i.e., dehydration of the natural gas hydrate, occurs in a counter-current contactor. In this contactor propane vapors may be passed, e.g., bubbled, through the slurry of natural gas hydrate in propane. The gaseous propane is preferably obtained by evaporation of part of the carrier liquid but it may come from other sources. The temperature here is preferably substantially the same as that at which hydration was accomplished, for example, about 35° F. It may be somewhat higher or lower, for example, from about 25° F. up to 40° F., or a little more. However, the pressure is reduced substantially, being definely below 80 p.s.i.a. As a result, the natural gas is released by contacting the particulate hydrate with propane vapors. When propane is thus passed through the slurry of natural gas hydrate, preferably at about 35° F. or between 25-40° F., and under the reduced pressure, below 80 p.s.i.a., and preferably between about 15 and 75 p.s.i.a., the natural gas hydrate decomposes readily. The required propane vapors for this step may be produced by supplying heat to the mixture in a re-boiler. The warm propane vapor then decomposes the natural gas hydrate but the system is kept under temperature and pressure conditions which favor the formation of the propane hydrate. The principal factor here normally is the reduction in pressure. A slurry of propane hydrate in propane which forms is then withdrawn from the contactor and is returned to the vessel as the latter is made ready to return for another load of natural gas. This propane hydrate slurry is desirably sub-cooled, preferably by indirect contact with the incoming natural gas hydrate slurry.

After the natural gas has been dehydrated and delivered and the vessel which brought it is reloaded with the propane hydrate slurry, suitable temperature and pressure conditions are established to stabilize the propane hydrate. This slurry is then shipped back to the point of origin, namely, to the original gas hydration plant. There the propane hydrate slurry will supply a good part, though not all, of the required refrigeration energy. It also will supply most or all of the water of hydration which is required for contacting with another load of natural gas. Hydration is an exothermic process and considerable refrigeration is normally required.

Figure 2:
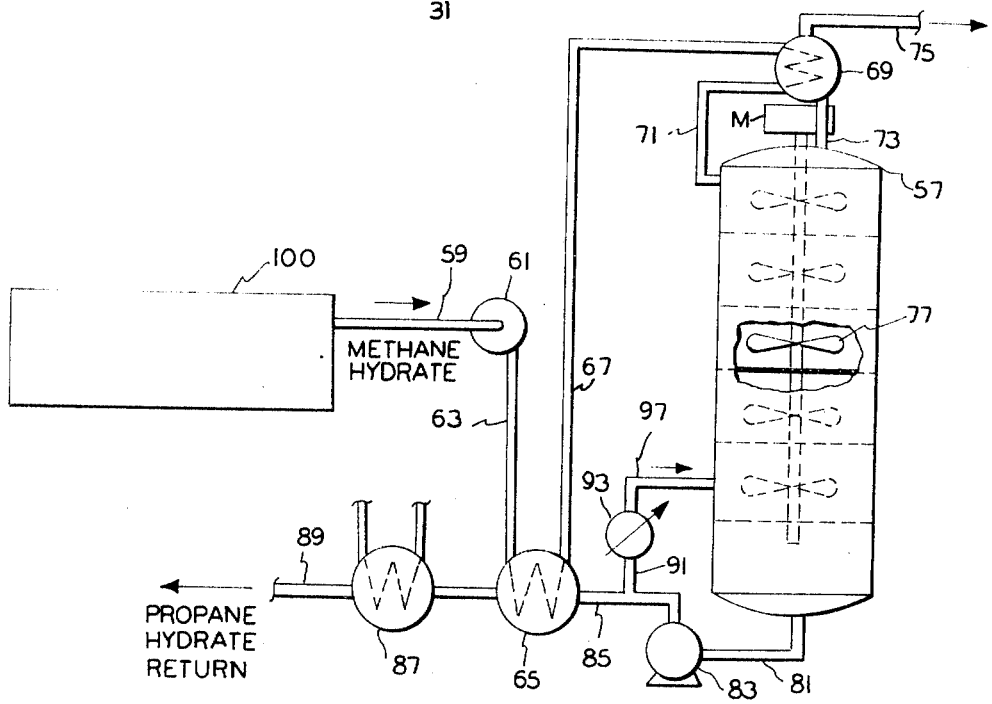

The invention will be more fully understood by referring to the accompanying drawing, wherein FIG. 1 shows diagrammatically an example of a system for hydrating the natural gas to prepare it for shipment. FIG. 2 shows a system for releasing the natural gas at the point of delivery.

Referring in detail to the drawings, a vessel 11 is shown into which natural gas is fed at a point near the bottom through line 13. The natural gas is preferably cooled by passing it through a refrigerator heat exchanger or cooling device 15. The vessel contains a stirring device 17 having multiple blades. The stirring device is driven by a motor 19, shown at the top. As the natural gas contacts the slurry in vessel 11, much of it becomes hydrated but usually not all. Some of it passes to the top of the vessel and escapes through a line 21. It is preferably recycled from this line by means of a compressor 25 by which it is compressed and passed back to the supply line 13 through line 23. The recycle compressor 25 is driven by an appropriate motor 27.

From the bottom of the mixing and contacting vessel 11 the hydrate slurry is withdrawn, the methane or natural gas having largely replaced the propane in the crystalline hydrate. This withdrawal occurs through line 29. The line passes into a heat exchanger 31 where the slurry is indirectly contacted and cooled by the cold propane hydrate slurry entering from line 33. The chilled natural gas hydrate, now slurried in liquid propane passes from the heat exchanger 31 to a vessel or tank 40 through line 35.

It will be understood, of course, that the vessel 40 preferably will be equipped with appropriate refrigeration equipment, not shown, to maintain the storage temperature at a level such that the methane will not be dehydrated during the storage and/or transportation period. This may require some insulation of the tanks or storage vessels actually containing the hydrate and/or the provision of some mechanical refrigeration. However, a very moderate amount of refrigeration ordinarily will be adequate. In some cases refrigeration may not be required at all for short storage times if pressure is appropriate and the thermal insulation is good.

Upon arriving at its destination, the natural gas included in the hydrate will be delivered by decomposing the hydrate. This dehydration-hydration procedure is illustrated in FIG. 2. It is essentially the reverse of FIG. 1. In this case a contacting and mixing vessel 57, which is essentially like vessel 11 of FIG. 1, is used to accomplish the dehydration. The slurry of natural gas hydrate from the vessel enters through line 59 into a pump 61 by means of which it is forced through a line 63 to a heat exchanger 65. From the heat exchanger 65 the stream passes through a line 67 to another heat exchanger 69 and finally through a line 71 into the vessel 57.

In vessel 57 dehydration of the methane or natural gas takes place, the released gas passing upwards through a line 73 and through heat exchanger 69 in indirect contact with the inflowing hydrate, and finally out of the system through line 75 to the point of use or distribution. Meanwhile, propane hydrate is being formed also in vessel 57, which is equipped with a suitable stirrer or contacting mechanism 77. The latter is driven by a suitable motor M. Vessel 57 is kept at appropriate pressure and temperature for formation of the propane hydrate. The temperature preferred is around 30° to 35° F., i.e., between 25-40° F. and the pressure is below 80 p.s.i.a., preferably between about 15 and 75 p.s.i.a. The propane hydrate, now in solid particulate form, is slurried in liquid propane. This slurry passes through line 81 out of the bottom of the vessel and through a pump 83 to line 85, then through heat exchanger 65. From here it may go into the vessel. Preferably, it passes to another heat exchanger 87 for final refrigeration, preferably to a temperature of about −40° F., then finally it goes to line 89. The latter line leads the propane hydrate slurry back to the vessel 100. In this vessel this cold material is held in stable storage and it may be kept in storage and/or transported back to the point of origin for another loading of natural gas. From the pump 83, also, a recycle line 91 is provided, so that part of the stream may pass through another heat exchanger 93. The latter is supplied with heat, from any suitable source, e.g., in the form of steam. This added heat expedites dehydration of the methane in vessel 57. Since the level of heat input in 93 is relatively low, 30-50° F., some heating medium other than steam may be used economically to recover this valuable refrigeration. Water of appropriate temperature is very suitable.

The re-cycle line from the heater is indicated at 97 and it leads the re-cycled and mildly heated liquid and vapor, with such hydrate as it may contain, back into the lower part of the vessel 57. From here any residual methane will be released and will ascend upwardly, counter-current to the descending major stream of methane hydrate which is being dehydrated. By re-cycling in this manner, a more complete delivery of the hydrated natural gas is accomplished and the efficiency of the over-all system is somewhat improved.

It will be obvious that various modifications may be made in the system without departing substantially from the purpose and spirit thereof. In general, the methane hydration will be carried out at pressure substantially above 80 p.s.i.a. and dehydration (or conversion to propane hydrate) at substantially below 80 p.s.i.a. The temperature during hydration and dehydration is preferably about 32° F. or between 25–40° F., but during the storage or travel it may be substantially lower.

It will be understood also that butane, or butane-propane mixtures may, at least in some cases, be substituted for propane as the carrier liquid and as the return-trip hydrate. In fact, various hydratable hydrocarbons and mixtures may be used. In other words, the carrier liquid may be a $C_3$, $C_4$, $C_5$, or mixture, of saturated or even unsaturated hydrocarbons. It is intended by the claims which follow to cover these and other modifications that would suggest themselves to those skilled in the art, so far as the prior art permits.

What is claimed is:

1. The method of transporting natural gas by ship from a loading point to a point of delivery remote from said loading point which comprises:
   (a) forming wet gas hydrate slurry at greater than 80 p.s.i.a. and at a temperature within the range of about 25 to 40° F. by combining natural gas and $C_3$–$C_5$ hydrocarbon hydrate slurried in said hydrocarbon;
   (b) cooling the resultant natural gas slurry to about −40° F. and transporting the cooled natural gas slurry in said ship at about atmospheric pressure to said delivery point;
   (c) releasing said natural gas by contacting said natural gas hydrate slurry with $C_3$–$C_5$ hydrocarbon vapor at less than 80 p.s.i.a. and at about 25 to 40° F. to form a $C_3$–$C_5$ hydrocarbon hydrate slurry in said hydrocarbon;
   (d) cooling the resultant slurry to about −35 to −40° F. and transporting said resultant slurry by said ship back to said loading point at about atmospheric pressure; and
   (e) repeating steps (a) through (d).

2. Method according to claim 1 wherein the $C_3$–$C_5$ hydrocarbon is propane.

3. Method according to claim 1 wherein the $C_3$–$C_5$ hydrocarbon is butane.

4. Method according to claim 1 wherein the $C_3$–$C_5$ hydrocarbon is a mixture of propane and butane.

References Cited

UNITED STATES PATENTS

| 2,356,407 | 8/1944 | Hutchinson | 48—190 |
| 2,399,723 | 5/1946 | Crowther | 48—190 X |
| 2,938,359 | 5/1960 | Cobb et al. | 62—47 |

FOREIGN PATENTS

| 610,237 | 12/1960 | Canada. |

OTHER REFERENCES

Wilcox et al., Industrial and Engineering Chemistry, vol. 33, pages 662–665 (May 1941).

JOSEPH SCOVRONEK, Primary Examiner

U.S. Cl. X.R.

62—12, 55, 58; 260—676